(12) United States Patent
Mahajan

(10) Patent No.: US 10,922,744 B1
(45) Date of Patent: Feb. 16, 2021

(54) OBJECT IDENTIFICATION IN SOCIAL MEDIA POST

(71) Applicant: A9.com, Inc., Palo Alto, CA (US)

(72) Inventor: Satayan Mahajan, Cambridge, MA (US)

(73) Assignee: A9.com, Inc., Palo Alto, CA (US)

( * ) Notice: Subject to any disclaimer, the term of this patent is extended or adjusted under 35 U.S.C. 154(b) by 193 days.

(21) Appl. No.: 15/926,917

(22) Filed: Mar. 20, 2018

(51) Int. Cl.
| | |
|---|---|
| *G06Q 30/00* | (2012.01) |
| *G06Q 30/06* | (2012.01) |
| *G06T 7/70* | (2017.01) |
| *G06Q 50/00* | (2012.01) |
| *G06F 16/9535* | (2019.01) |
| *H04L 12/58* | (2006.01) |

(52) U.S. Cl.
CPC ..... *G06Q 30/0643* (2013.01); *G06F 16/9535* (2019.01); *G06Q 30/0625* (2013.01); *G06Q 50/01* (2013.01); *G06T 7/70* (2017.01); *H04L 51/10* (2013.01); *H04L 51/32* (2013.01)

(58) Field of Classification Search
CPC ....................................... G06Q 30/0601–0645
See application file for complete search history.

(56) References Cited

U.S. PATENT DOCUMENTS

| | | |
|---|---|---|
| 2013/0083999 A1 | 4/2013 | Bhardwaj et al. |
| 2014/0052587 A1 | 2/2014 | Bereck et al. |
| 2014/0337176 A1 | 11/2014 | Ruvini |
| 2015/0227972 A1* | 8/2015 | Tang ................ G06Q 30/0255 705/14.53 |
| 2016/0042250 A1* | 2/2016 | Cordova-Diba ... G06K 9/00671 382/180 |
| 2016/0055250 A1* | 2/2016 | Rush .................... G06F 16/9535 707/733 |
| 2017/0345076 A1* | 11/2017 | Nair ..................... G06Q 30/0282 |
| 2018/0308126 A1* | 10/2018 | Avegliano .......... G06Q 30/0255 |
| 2019/0149752 A1* | 5/2019 | Takahashi .......... H04N 5/23206 348/222.1 |

OTHER PUBLICATIONS

"Photoslurp, 'Our Platform', Nov. 19, 2017 (according to web. archive.org), photoslurp.com, PDF pp. 1-3" (Year: 2017).*
International Search Report and Written Opinion issued in related International Application No. PCT/US2019/022928 dated Jun. 28, 2019.

* cited by examiner

*Primary Examiner* — William J Allen
*Assistant Examiner* — Maria S. P. Heath
(74) *Attorney, Agent, or Firm* — Hogan Lovells US LLP

(57) ABSTRACT

Various embodiments of systems and methods allow the presentation of a content item with a marketplace section. A system can receive a content item and analyze the content item to identify at least one featured object in the content item. The system can then match the at least one featured object with a marketplace item. If the marketplace item passes various filtering criteria, then the author of the content item can approve the marketplace item being presented with the content item. A system can then receive data for the content item from an application server and data for the marketplace item from a marketplace server and generate a unified presentation of the content item and the marketplace item. A user can then interact with a marketplace section to buy the marketplace item.

20 Claims, 7 Drawing Sheets

OBJECT IDENTIFICATION IN SOCIAL MEDIA POST

BACKGROUND

As more people turn to social media applications for media consumption, monetization strategies have proven elusive for application providers and content creators. Many content creators enter into arrangements with advertisers or sponsors to generate content mentioning the advertiser or sponsor. These content creators must then invite a consumer to act in some way that typically involves engaging the advertiser or sponsor off of the application. These calls to action may distract from a theme, style, or image of the content creator. Additionally, current techniques for advertisements on a website present advertisements catered to a viewer but not the website. This can result in advertisements that seem out of place on many web pages, lacking a visual correspondence or contextual relevance to the respective pages.

Even when consumers are enticed by a social media influencer or advertisement, a consumer may be wary of interrupting their experience by leaving the social media website or application. For example, if a consumer is watching a video and clicks an advertisement, the consumer will likely be taken to a new window or tab to learn more about the advertisement which can interrupt their video watching experience. Similarly, as the consumer moves from the social media website to a marketplace, it might take some time for the consumer to familiarize themselves with the design of the marketplace. For example, the layout and format of the marketplace might be completely different. Further, the marketplace might contain features, products, or terms not of current interest to a consumer who might only be interested in the product marketed.

BRIEF DESCRIPTION OF THE DRAWINGS

Various embodiments in accordance with the present disclosure will be described with reference to the drawings, in which.

DETAILED DESCRIPTION

Figure 1:
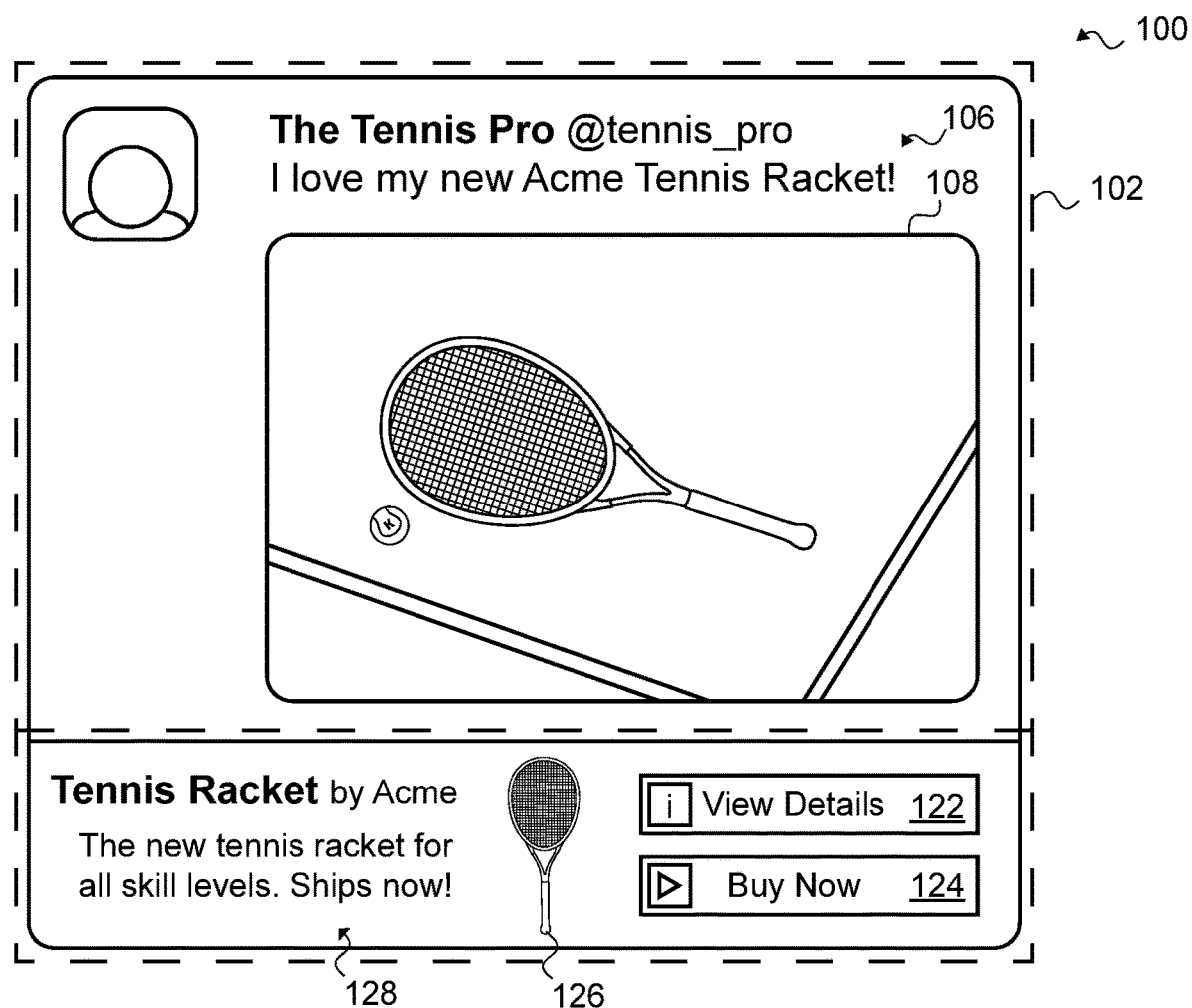
FIG. 1 depicts an example display of a content item and a marketplace section that can be used in accordance with various embodiments.

Systems and methods in accordance with various embodiments of the present disclosure may overcome one or more of the aforementioned and other deficiencies experienced in conventional approaches to presenting a content item and an invitation to purchase an object in the content item.

Disclosed herein are systems and methods for providing options for consuming (e.g., purchasing, leasing, downloading, or otherwise obtaining) an object related to a content item, such as a social media post or other user-provided content. For example if the content item is a social media post displaying or referencing an article of clothing, a marketplace option can provide an ability to purchase the article of clothing. The content item can be analyzed, by the marketplace or a third party, among other such options, and at least one object can be identified that is related to the content item. Computer vision and machine learning techniques can assist in identifying objects represented in the content item. In some embodiments, objects represented in the content item can be ranked based on whether they are featured in the content item, such as whether the objects are a primary focus or topic of the content item. Objects that are not the focus of the content item can be disregarded in some embodiments, or may have content surfaced in other ways.

Contextual information for the content item can be used to attempt to determine an approbation metric for the object with respect to the content item. For example, a social media post might express a positive sentiment towards the object, which might result in a relatively high approbation score. It may therefore be beneficial to provide an option to purchase the object that is associated with the social media post, such as from within the post or from a nearby section. However, if there is a negative sentiment in the content item towards the object, which might result in a relatively low approbation score, then it might be best to not offer an option to buy the object with the content item. Approbation scores may take into account other information as well, such as prominence in the post, content of comments to the post, words used in the post, a context in which the post is provided, etc. The score may also be calculated using a weighted combination of these and/or other such factors. If a decision to provide a purchase option is made, an attempt can be made to correlate the object with an item available from an electronic marketplace or other such source. The marketplace item can be the same brand and version as the object represented in the content item or it can be a comparable item.

In some embodiments an author, or other such source, that is going to publish the content item can have the option to review the identified marketplace item, or the content regarding the marketplace item that is to be displayed with the social media post or other such content. In cases where there are multiple marketplace items matched with the object, then the author can select the most appropriate or desirable marketplace item. A computer for a viewer can then receive the content item from an application server and data for the marketplace item from a marketplace server. The viewer can then interact with a marketplace section to purchase the marketplace item without leaving the application (or website for the application). This provides a seamless experience for the viewer and makes it so the viewer does not need to switch between websites to purchase something found on an application.

FIG. 1 depicts an example display 100 of a content item 102 and a marketplace section 128 according to some embodiments. An author can create the content item 102 including caption text 106 and a picture 108. The content item 102 can be a social media post and can be presented on "feeds" of other users of the same social media application. It should be understood that an author can publish the content item 102 on multiple social media applications, allowing users of the various applications to interact with the content item 102 on the respective applications. When another user views content item 102, they might be interested in learning more or purchasing objects represented in the content item 102. Past approaches might require a user to ask the author of the content item 102 for details on what the object is and where one might purchase it. This can be difficult and uncomfortable for certain users. Also, the author (i.e., the content creator) may wish to feature the object and promote the object, but also want the content item to have a normal and organic feel.

Content item 102 can be a social media post, video clip, private message (e.g., text, audio, photographic, or video), forum post, blog post, website, live stream, slideshow, video broadcast, videogame rendering (e.g., frame from a video game), videogame stream, videogame environment (e.g., 3D environment), audiobook, eBook, generated content (e.g., spoken responses) from a virtual assistant (e.g., from a smart speaker), song, podcast, picture, or reference such as a link to content. Content item 102 can be presented using a traditional display, a loudspeaker, an augmented reality system (i.e., where generated content or imagery is fused with "real" content or imagery giving the illusion that the generated content is interacting with the real content), a virtual reality system (i.e., where generated content adapts to movements of a user to simulate real experiences), or any combination thereof. Content item 102 can include any combination of audio, text, pictures, video, and links. Content item 102 can include metadata describing or relating to elements of content item 102. Content item 102 can be user-generated, computer-generated, or a combination of the two. Content item 102 can have a single author or multiple authors. Content item 102 can be publically accessible, accessible to users of a respective application, or accessible to a set of authorized users of the application. Content item 102 can be static, dynamic, and/or interactive. Content item 102 can be stored in a data system such as a hard drive or memory bank.

When another user on the application views, hears, or otherwise "consumes" content item 102, they might be interested in an object represented in the content item 102. For example, in FIG. 1, a user might be interested in a tennis racket or a ball featured in the picture 108. In past approaches, the author would have to explicitly specify the brand and model of an object or otherwise educate the viewer about the specifics. This can make the content item 102 seem to be more a marketing piece and not genuine content. Specifying details of the object can also detract from the intent of the content item. If the author does not provide specifics, the other user would have to investigate, perhaps reaching out to the author in a way that might be uncomfortable or inconvenient for the interested user. In some embodiments, the author is intentionally featuring or presenting an object in the content item. For example, the author might be a seller of the object or is paid to promote the object. In some embodiments, the content item is a review of the object. Alternatively, the author can organically present the object. The object can be ancillary to the content item 102 such that it is not featured or promoted. For example the object might be in the background of the content item.

Marketplace section 128 can include a description of a marketplace item 126 that corresponds to an object in the picture 108. In the illustrated embodiment, the marketplace section 128 includes, an image of the marketplace item 126, a price of the marketplace item 126, a rating of the marketplace item 126, and other details 122 about the marketplace item 126. The marketplace section 128 can also include an option to buy the marketplace item 126 (e.g., a "Buy Now" feature 124). Although marketplace section 128 can substantially be served by a marketplace server and can have indicia that it is provided by the marketplace server (e.g., trademarks, unique coloring, etc.) marketplace section 128 can be styled by the social media server to blend with the content item 102. In other words, marketplace section 128 can have a blended style incorporating elements of a social media application and elements of a marketplace, indicating collaboration between the two entities. Furthermore, text or other indicia can indicate that the author of the content item 102 is a collaborator in providing marketplace section 128, i.e., that the author approves of the marketplace section 128 being associated with his or her content item. In some embodiments, the marketplace section 128 is merely a button to "buy" a marketplace item, placed near the object.

A marketplace item 126 can be of a variety of forms and formats. For example, the marketplace item 126 can be a physical object or access rights to a digital object. The marketplace item 126 can be consumed. That is, the marketplace item 126 can be bought, rented, leased, traded, downloaded, accessed or otherwise obtained.

Figure 2A:
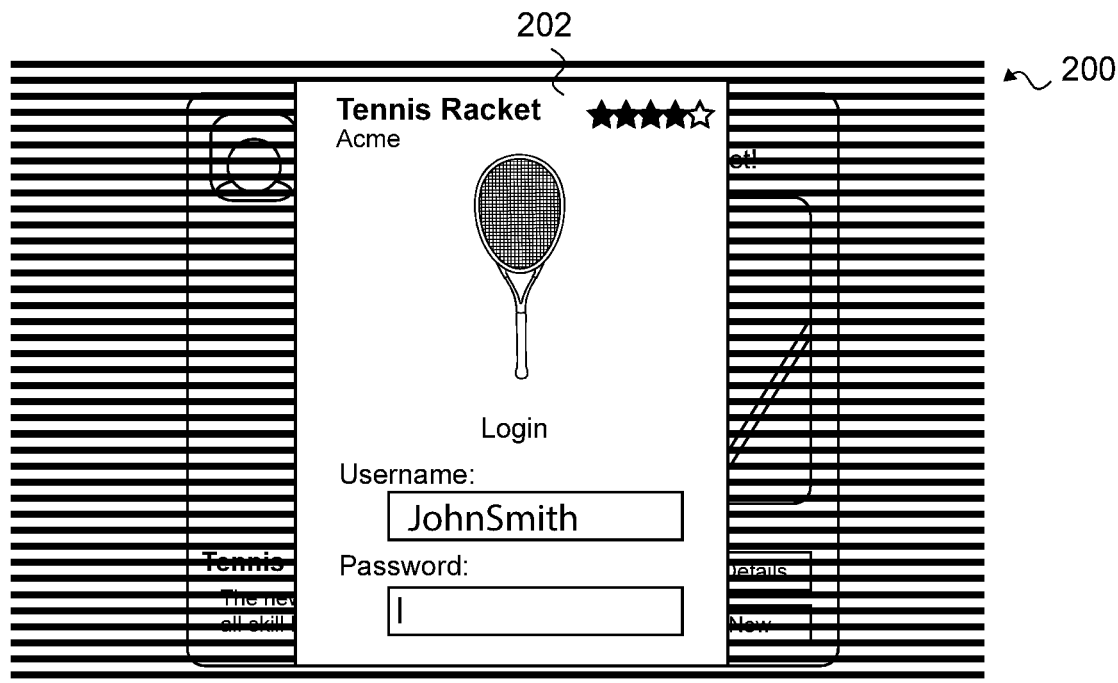
FIGS. 2A and 2B depict example screens and showing a purchase workflow for purchasing the marketplace item presented in marketplace section that can be used in accordance with various embodiments.
Figure 2B:
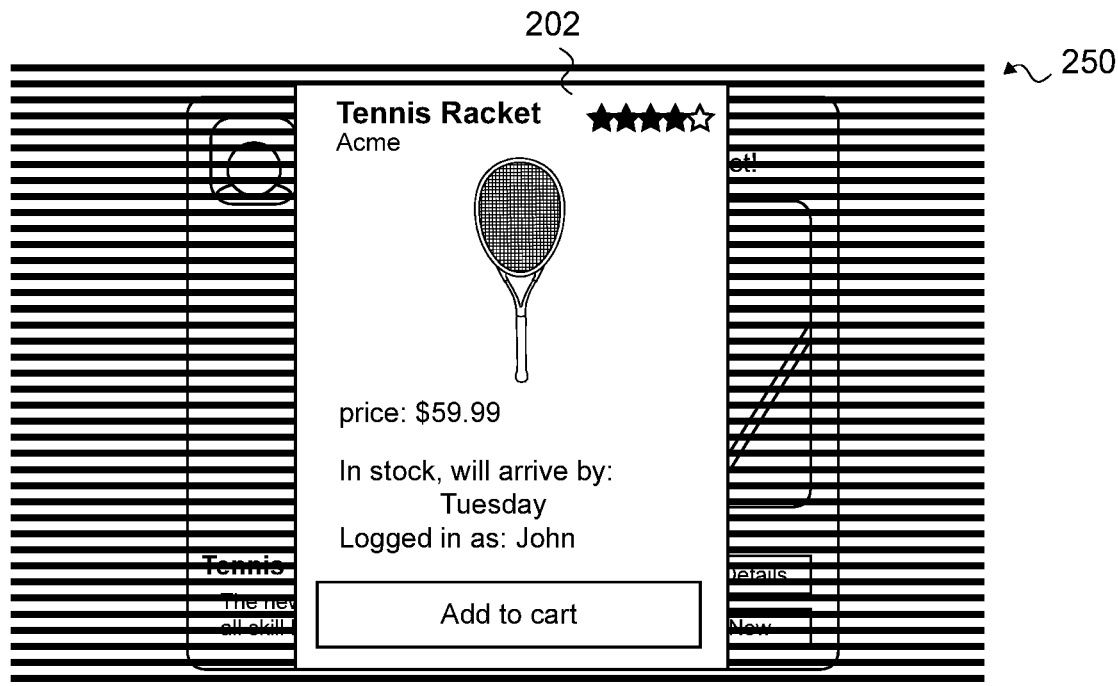

FIGS. 2A and 2B depict example screens 200 and 250 showing a purchase flow for purchasing the marketplace item 126 presented in marketplace section 128. In FIG. 2A, a purchasing window 202 can be overlaid on top of the social media page. The horizontal lines in example screens 200 and 250 represent the social media page being darkened so that a user can focus on purchasing window 202 without feeling like they left the social media page. In addition to overlaying and darkening, other techniques can be used to focus on purchasing window 202 such as blurring the social media page, making the social media page black and white, enhancing the border of the purchasing window 202, animating the purchasing window (e.g., using a "pop-in" animation), etc. The purchasing window 202 can be an extension of the marketplace section 128 such that marketplace section 128 is dynamic and, upon a user selecting "buy now" 124, the marketplace section 128 can adapt to allow the user to submit their credentials.

After providing their credentials in purchasing window 202, a user can confirm their purchase as depicted in example screen 250. Purchasing window 202 can facilitate order customization, allowing a user to select a version of the marketplace item (e.g., a size, color, model number, etc.) and select a shipping address.

The purchasing window 202 can be served by the marketplace server and can indicate that the user is transacting with the marketplace and not the social media system (e.g., by having only marketplace branding or by explicitly stating that the transaction is with the marketplace). After a user interacts with the purchasing window 202, the purchasing window 202 can give up focus and return the user to example display 100. Thus, the user feels like engaging the marketplace is a natural transition in the social media application and does not feel like it is a disruptive experience.

Figure 3:
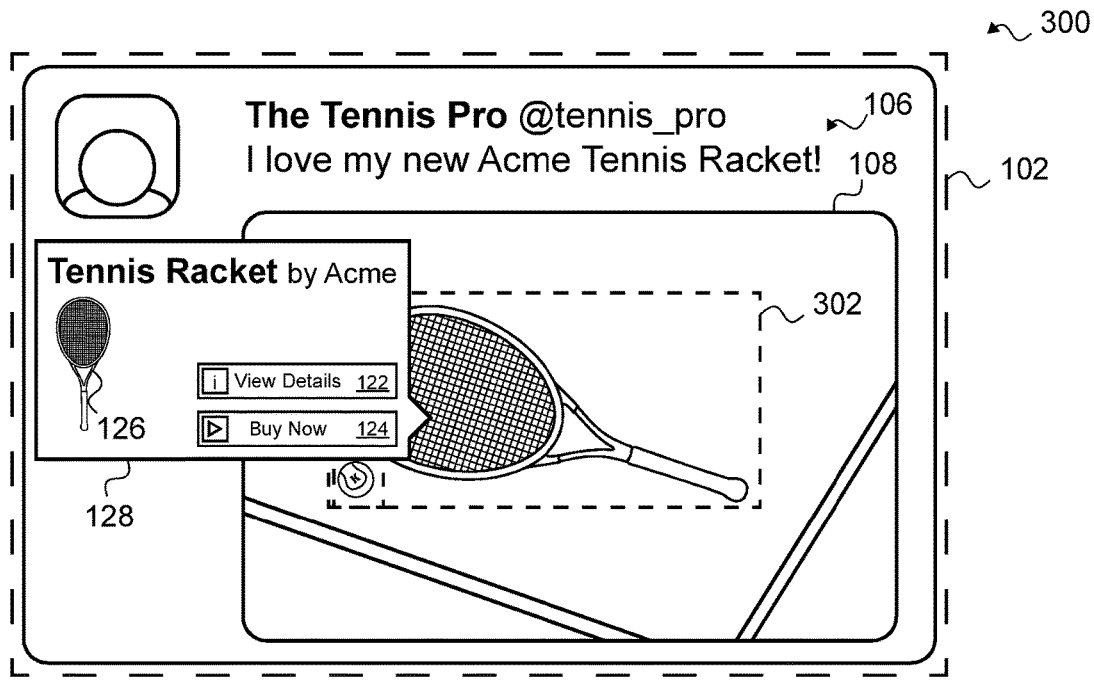
FIG. 3 depicts an example display exemplifying different presentation of marketplace section that can be used in accordance with various embodiments.

FIG. 3 depicts an example display 300 similar to example display 100 but exemplifying a different presentation of marketplace section 128. For example, a user can hover over or otherwise select region 302 bounding the tennis racket in the picture 108. Marketplace section 128 can then be shown with content item 102, providing an opportunity to purchase the marketplace item 126. Different regions 302 bounding different detected objects can be associated with different marketplace sections 128 to purchase corresponding items. This can allow multiple items in a content item 102 to be purchasable.

In some embodiments, an image segmentation algorithm can determine outlines of objects in an image. Once object outlines are determined, those segments can be associated with the related marketplace items, allowing a more refined selection area in contrast to a simple bounding box as presented in FIG. 3. A user can then select an object and purchase it. In some embodiments, when a user selects the object, the object can change color, have a border appear, or otherwise be isolated from the remainder of the content item or picture. If there are multiple objects of the same type or class, those objects can be grouped together such that hovering over one of them will select them all. In some embodiments, when an object is selected, a viewport of the content item (e.g., an image frame) scales and/or rotates to bring the object into focus. In some embodiments, the object depicted in the content item can morph into the representation of a marketplace item (e.g., marketplace item 126). In this way, a user can associate an image of the marketplace item (which may have been taken in a studio setting and would look appealing) with the image of the object in the content item. Signs of use can appear to be removed as the object morphs into the marketplace item.

Figure 4:
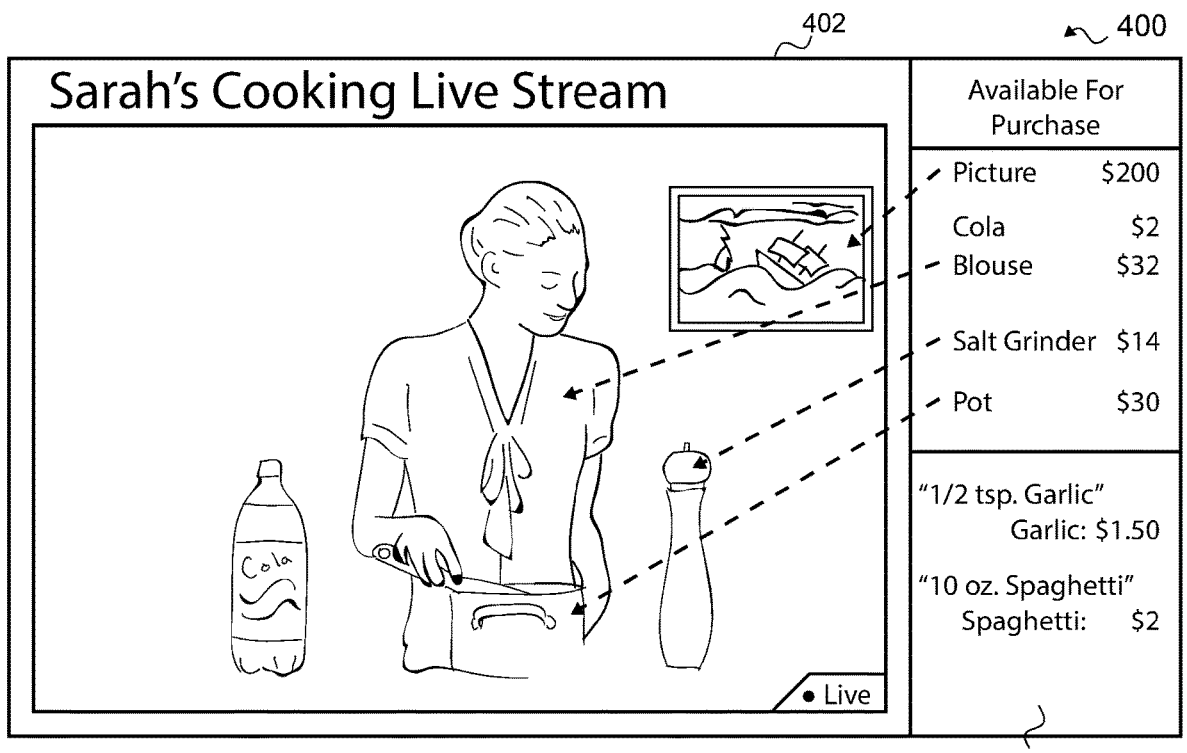
FIG. 4 illustrates an example display for enabling a user to purchase items in a video content item that can be used in accordance with various embodiments.

FIG. 4 illustrates an example display 400 for enabling a user to purchase items in a video content item 402. The video content item can be a live stream, televised broadcast, pre-recorded video, or movie. A marketplace section 420 can then depict items that are currently displayed in video content item 402 and provide an opportunity for a viewer to purchase those items. In some embodiments, the marketplace section 420 is typically hidden but can be visible when the video is paused.

A content item such as a video as shown in example display 400 might present objects not visible or not visually discernible. Objects can be identified through audio recognition and associated marketplace items can be presented at a relevant time. For example, in a cooking video, the chef might describe ingredients without showing the ingredients themselves. As the chef describes the ingredients, the system can analyze the audio and identify the referenced ingredients (i.e., objects). For example "½ tsp. Garlic" or "10 oz. Spaghetti" as illustrated in FIG. 4. The system can then match the exact product being referenced or a sufficient substitute. In some embodiments, the ingredients are only shown after they are referenced; alternatively they can be shown during the duration of the video. It should be understood that the object can be presented to a user as well as the matched marketplace item such as depicted in FIG. 4. For example, the object might be a generic term for the object whereas the matched marketplace item can be a specific product.

In some embodiments, viewers of content can submit their own suggestions for matches of objects to marketplace items. For example, an image segmentation algorithm can determine that a certain portion of the stream represents an object and a user can then, using a keyword search or otherwise, identify the appropriate marketplace item to associate with the object. In some embodiments, only suggestions from certain users are accepted. For example, only users who have a certain amount of credibility with the application can be allowed to submit marketplace item suggestions. In some embodiments, only authors can submit marketplace item suggestions. In some embodiments, viewers can submit suggestions for what objects are represented while the marketplace automatically matches the objects to marketplace items.

In some embodiments, the author of the content item is also the seller of the associated marketplace items. For example, the author/seller might be doing a promotion of a set of marketplace items. The author/seller can then submit a list of marketplace items that the author/seller is intending on showcasing during their presentation. The system can then detect when those items are on screen and present them as options to purchase.

In some embodiments, a user purchasing a marketplace item presented in a content item can be a "reaction" to the content item visible to other users. For example, if a user gives permission for this information to be visible to others, they can see that "user John just purchased the item on screen." The purchase can be associated with the content item and the author for analytics or compensation purposes.

Figure 5:
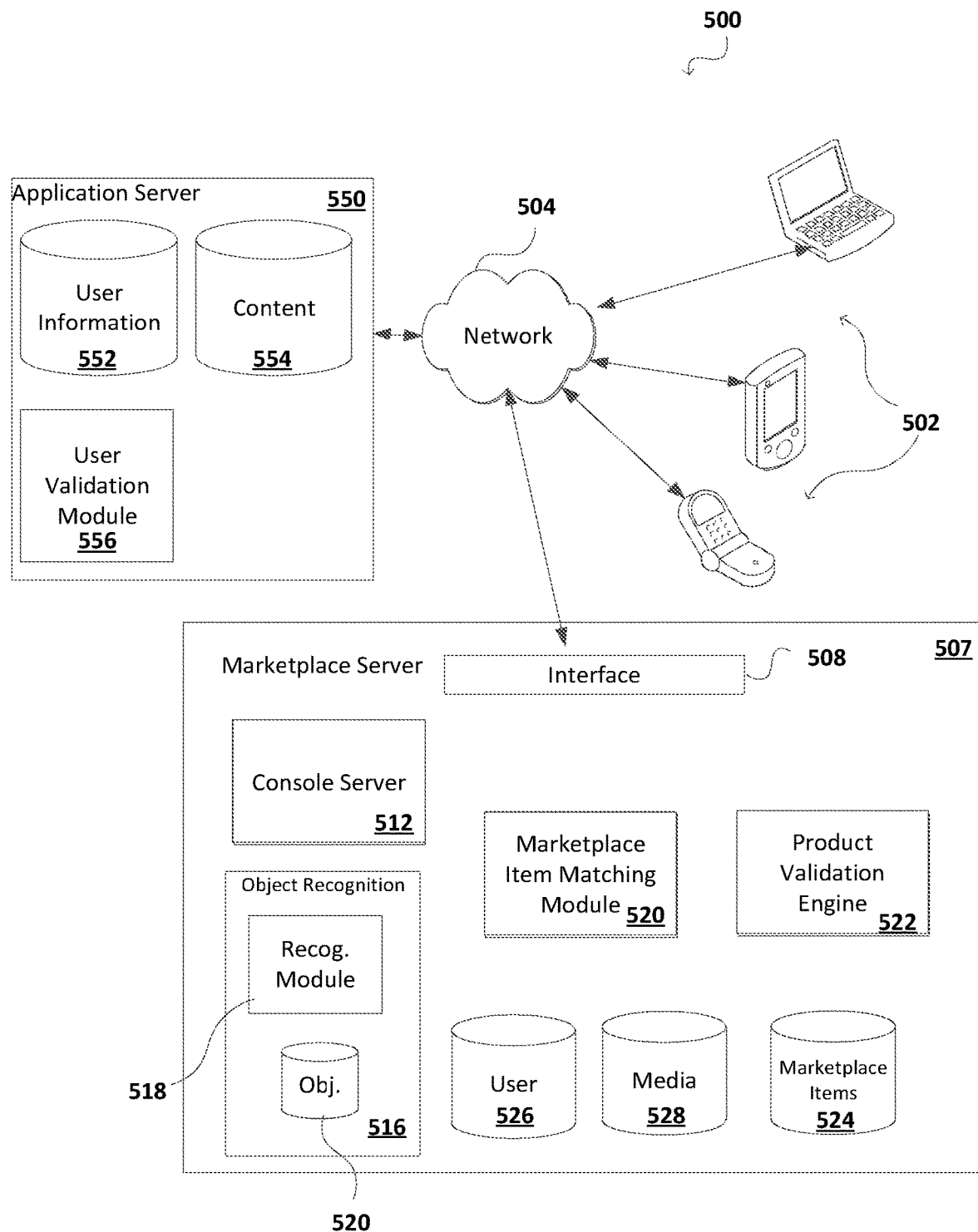
FIG. 5 illustrates an example environment for providing content items and information related to marketplace items across an electronic network that can be used in accordance with various embodiments.

FIG. 5 illustrates an example of an environment 500 for providing content items and information for marketplace items across an electronic network that can be used in accordance with various embodiments. Although the example environment is presented as an Internet-based environment for purposes of explanation, it should be understood that different network environments may be used, as appropriate, to implement various embodiments. The example environment includes can include a number of electronic client devices 502, which can include any appropriate device operable to send and receive requests, messages, or information over an appropriate network 504 and convey information back to a user of the device. Examples of such client devices include personal computers, cell phones, handheld messaging devices, laptop computers, set-top boxes, personal data assistants, electronic book readers, and the like. Each device can correspond to one or more users, and each user can have one or more devices. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, and the environment includes an application server 550 for serving content items, and marketplace server 507 for serving information related to marketplace items. Client devices 502 can communicate with application server 550 and marketplace server 507. Similarly, application server 550 and marketplace server 507 can intercommunicate. Various networking standards and protocols can facilitate communication between entities on network 504.

Application server 550 can be for a social media application, a content production application, a blogging application, a streaming service, or any other content distribution entity. It should be understood that "application" as used herein can refer to a website, program, or resource for retrieving and/or distributing content. Application server 550 can be a single device or a federation of multiple devices. In some embodiments, application server is a system hosted on a cloud computing service. Application server 550 can have a user information database 552 for storing information about users. User information database 552 can include information for validating users when a user attempts to log in to application server 550. User information database 552 can include details about a user such as their age, gender, preferences, interests, geographical location, language, etc. User information database 552 can include login information for third party entities, such as marketplace server 507. For example, a user might give credentials to application server 550 so that application server 550 can interact with marketplace server 507 on the user's behalf In some embodiments, a user can request a special token from marketplace server 507 to authenticate application server 550 with marketplace server 507. Such a token can be stored in user information database 552 and can have a subset of abilities with marketplace server 507. For example, the token might be associated with "read-only" abilities such that an entity using the token can obtain information related to the user but do not grant the ability to modify information or purchase items.

Content database 554 can store content items generated by users of application server 550. For example, content database 554 can include any combination of text items, video items, links, references, pictures, audio items, files, etc. Content items in content database 554 can be associated with one or more authors who are users to the application server 550. An author can be a user who created, modified, shared, or uploaded the content item to the application server 550. Other users, who are not authors, can retrieve (e.g., for viewing or otherwise consuming) content items on content database. In some embodiments, only users who have a connection to an author are authorized to retrieve the content item. For example, only "friends" might be permitted to retrieve the content item. A user validation module 516 can ensure that content items are only retrievable by authorized users. In some embodiments, a content item is accessible to any user of the application. A content item can be accessible to any device, regardless of whether the device is associated with a user registered in user information database 552. Marketplace server 507 can receive communications at interface layer 508. As known for network environments, the interface layer can include components such as interfaces (e.g., APIs), load balancers, request and/or data routers, and the like. For example, the interface layer can comprise a number of API endpoints for fulfilling requests pertaining to the principles herein disclosed. Marketplace server 507 can receive a content item, a portion of a content item, a version of the content item (e.g., after compression), information for an object in a content item, or keywords of the content item, and return one or more marketplace items. In some embodiments, client device 502 preprocesses a content item, e.g., to detect objects, and sends the results to marketplace server 507. For example, client device 502 can send keywords for an object to marketplace server 507.

A component such as the console server 512 cause a video feed, picture, text, etc. to be analyzed provide data to an object recognition service 516 or sub-system. The object recognition service 516 can analyze the data using one or more recognition modules 518, as may include object detection algorithms or trained neural networks, among other such options, and can compare the data in some embodiments against representations of object stored to an object data store 520. Confidence and/or probability scores can be generated for each determination in some embodiments, and a sequence of frames can be analyzed in some embodiments to improve the scores, including during the training or machine learning phase. The resulting object data, such as tags and timestamps, can then be used to match an object in a content item with a marketplace item.

A marketplace item matching module 520 can receive keywords that are recognized by recognition module 518 and match them to one or more marketplace items stored in marketplace items database 524. In some embodiments, marketplace item matching module matches other elements or derivatives of a content item to marketplace items. For example, marketplace item matching module 520 can do an image search to match marketplace items with a picture from a content item (thus finding marketplace items that look like the object, even if the object isn't categorized or identified). Matches can be given a confidence score. In some embodiments, an object can match multiple marketplace items. Matches that are below a confidence score can be discarded.

In some embodiments, the marketplace matching module 520 first generates a subset of possible matches using user database 526. For example, past purchases of a user can be stored in user database 526 and the marketplace matching module can attempt a match with only those past purchases, with the user's permission. In some embodiments, a category term (e.g., "basketballs" can help generate a subset of marketplace items for easier matching (e.g., by doing an image comparison between the object and the various marketplace items). Marketplace items 524 can have a media database 528 storing audio, video, pictures, and text for marketplace items. Media database 528 can also comprise user reviews of marketplace items. In some embodiments, a match can be based on matching text from a content item to a user review of a marketplace item (e.g., if both of them state "this basketball had a weird smell").

Marketplace server 507 can include a product validation engine 522. In some embodiments, product validation engine 522 acts as a filter to select one or more of the best matches produced from marketplace item matching module 520. Product validation engine 522 can ensure that only quality matches are determined and that policies are followed. For example, match validation module can ensure that only marketplace items of a specific rating, number of reviews, specific category, etc. are matched. Certain marketplace items can have limitations on what they can be matched with (e.g., a seller might prefer their item not be matched with a competitor product). Also certain marketplace items can have restrictions on the age of an author of a content item, the context of the content item, or that the object has a minimum approbation score. Product validation engine 522 can consider whether a marketplace item is in stock, that the seller has a deal, the content of reviews, that expedited shipping is available, etc. Product validation engine can approve certain matches, reject certain matches, or approve certain matches with caveats (e.g., that the item is on backorder).

Product validation engine can review each match individually to determine if a seller, manufacturer, author (of the content item), or marketplace have specific policies for the marketplace item. For example, a seller might require that only products with a minimum rating are validated. The marketplace might set a policy to allow new products to have a lower minimum number of reviews, etc.

Figure 6:
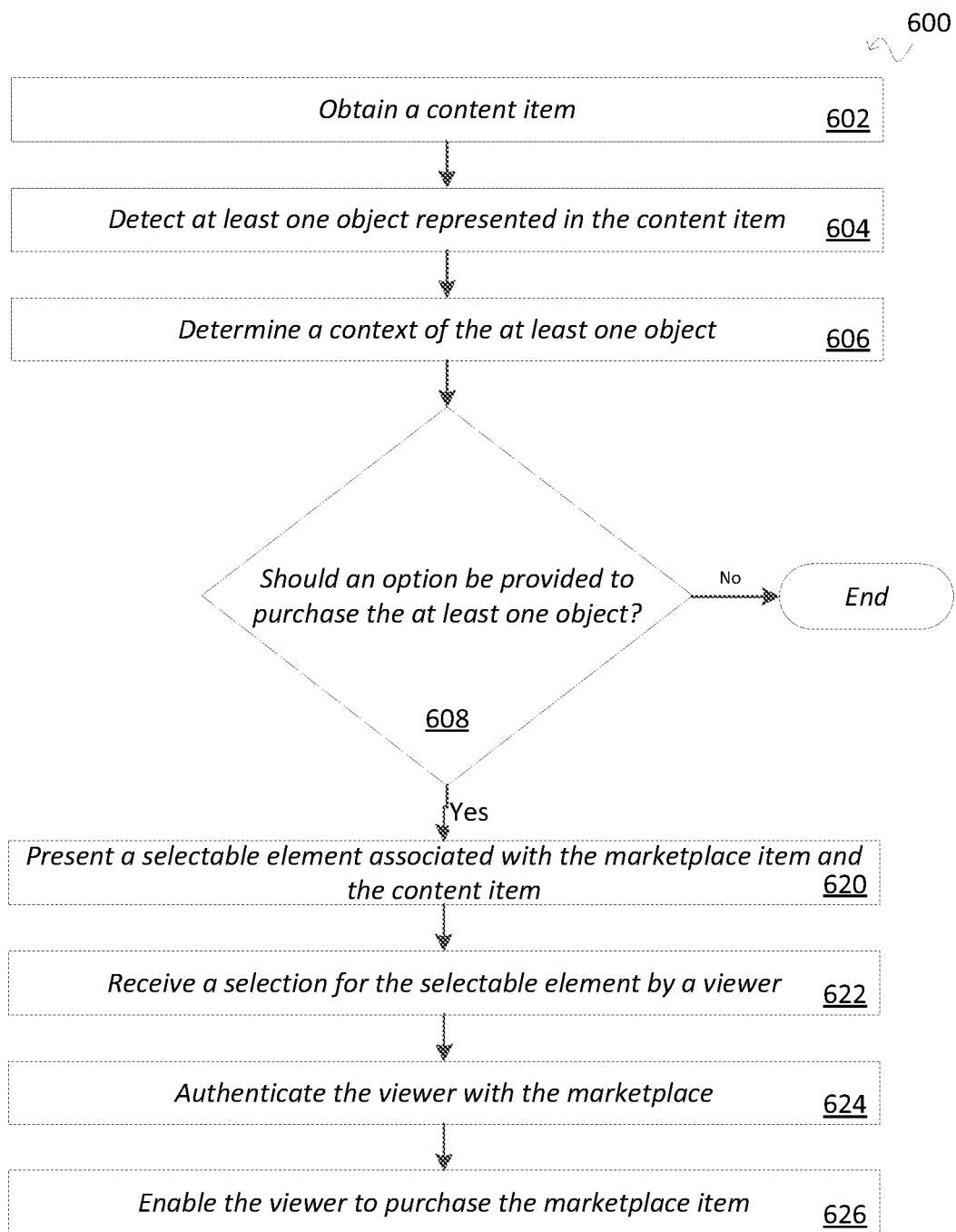
FIG. 6 illustrates an example process for identifying an object in a content item and enabling a user to purchase the object using a selectable marketplace element presented with the content item in accordance with various embodiments.

FIG. 6 illustrates an example process 600 for identifying an object in a content item and enabling a user to purchase the object using a selectable marketplace element presented with the content item. It should be understood that, for this and other processes discussed herein, there can be additional, fewer, or alternative steps, performed in similar or alternative steps, or in parallel, within the scope of the various embodiments unless otherwise stated.

In this example, a system obtains a content item at step 602. The content item can be a social media post, a video clip, a private message (e.g., text, audio, photographic, or video), a forum post, a blog post, a website, a live stream, a video broadcast, a videogame rendering, an audiobook, an eBook, or generated content from a virtual assistant (e.g., from a smart speaker). The content item can include an audio clip, a video clip, a photograph, caption text, and a creation date and time.

In some embodiments, the content item is received from the application server 550. Alternatively, the content item can be received from a user on a client device 502. The content item can be received as it is being generated such as for a live stream. The content item can be "rendered" or be data that instructs a computer how to render the content item. In some embodiments, a separate entity receives the content item and pre-processes it. Pre-processing can include shrinking the file size or decreasing a bitrate.

The content item can be complete or just a portion of the content item. If only a portion of the content item is received, it can be a portion deemed relevant to object identification, such as a picture or text, while excluding information that is deemed irrelevant. In some embodiments, data is modified to preserve privacy. For example, a precise location can be replaced with a general region. In order to minimize data transfer costs and processing time, the content item can be compressed. For example, instead of receiving an entire video clip, only certain frames of the video segment can be obtained (such as a frame per second instead of 30). In some embodiments, a first version of the content item (e.g., compressed to a small file size) is obtained and, if objects are identified, then a second version of the content item (e.g., less compressed) can be obtained to do a more thorough analysis. This can be useful for content items that are difficult to process such as videos. For example, after reviewing a compressed version of a video, a system might determine that a basketball is in the video; it can then request a higher-resolution version of the video to determine the exact brand of basketball because such information may have been illegible at the higher compression.

The content item can be created by an author. The author can have an account with an application for presenting the content item, such as a social media application. The author can also have an account with an online marketplace that sells marketplace items. In some embodiments, the author has given authorization for the application (e.g., a social media application) to access the author's account on the marketplace. For example, the marketplace can generate a token that application server can use to access marketplace server on the author's behalf.

In some embodiments, the application server 550 sends the content item to the marketplace server unprovoked. For example, when an author drafts a content item, this can trigger the application server to send the content item to the marketplace server 507. Alternatively or additionally, the marketplace server 507 can, unprovoked, request content items on application server 550 for analysis. For example, the author can give marketplace server 507 access to content items for the author on application server 550 (e.g., using a token). The marketplace server 507 can then periodically search content items.

In some embodiments, marketplace server 507 searches publicly accessible content items and then can invite authors to be promotional partners and allow other users to purchase relevant marketplace items by engaging a marketplace section inserted with the content item. This can be helpful because the marketplace server can identify potential partners based on whether they feature the relevant object and what type of sentiment is presented with it.

At least one object represented in the content item can be detected 604. For example, a system can perform computer vision techniques to detect the at least one object. There can be multiple objects detected in the content item. A machine learning system can be trained to detect objects within content items. Such a system can be trained based on marketplace data which might associate marketplace items with pictures of the marketplace item. In some embodiments, users can tag or otherwise identify objects in a content item. This user-submitted data can help teach a machine learning system to identify objects.

In order to prevent a user or viewer from becoming overwhelmed by having too many options for purchase in one content item, the multiple objects can be filtered based on various criteria. In some embodiments, after objects are detected, the objects are ranked. Ranking can help inform marketplace item matching later on. Ranking can also help filter a large number of objects. In some embodiments, ranking can be based on how prominently the objects are featured in the content item. For example, being featured can mean that the object is closer to the front and center of the content item (for content items with images). Being featured can be based on caption text corresponding to the object, such as a caption being about a tennis racket depicted in the content item as shown in FIG. 1. Being featured can be based on the amount of time that the object is presented in the content item (e.g., for videos or audio clips).

The ranking can also be based on how a person in the content item is interacting with the object. For example, if a person is wearing the object, holding the object, or looking at or near the object, then the ranking can be higher whereas if the person has their back to the object, then the ranking can be lower. The ranking can be based on the position or orientation of the object, for example if the object is "facing" the viewer or if the object is right-side up. The ranking can be based on any type of optical lucidity metrics such as contrast with a background or if the object is blurred.

In some content items, an author might annotate the content item (e.g., with metadata, a voiceover, or drawing on the content item); such an annotation can inform the ranking or selection of objects from the content item. For example, if the content item includes a photograph of a bar of chocolate and the author has drawn a heart around the bar of chocolate, it can be determined that the bar of chocolate is of more interest.

The ranking can include a confidence score that the portion of the content item actually represents the detected object. The ranking can be based on the likelihood that the object will be matched with a marketplace item. For example, objects that have visible text are more likely to be matched as the text can be turned into keywords which can be especially useful if the text is a brand or model name. Other facts can increase or decrease the likelihood that an object will be matched with a marketplace item, for example if the object is small, obscured, or dark, it may be difficult to identify specifics about the item. As objects are matched (or fail to match) with marketplace items, a machine learning algorithm can be trained to rank certain features higher or lower based on the likelihood that those features will result in a match.

Objects can be ranked or selected based on a profile for the author. The profile can be a profile with the content item (e.g., a social media application) or the marketplace. The profile might include demographic information such as an age or gender of the author. Some objects might be of more interest to the author and thus are more likely being featured in the content item. For example, if the author is a teenager, then a teen book might be of more interest to the author and more likely to be the focus on the content item. In some embodiments, a geographical location can inform the selection or ranking of an object. For example, if a location for the content item is a ski resort, then skiing equipment is more likely to be featured in the post and can be given a higher ranking. Regional and cultural interests can also inform object rankings.

In some embodiments, caption text for the content item can be used to identify an object that is featured. For example, the caption text might mention a brand or model of an object. An object can be detected based on a serial number being identified in the content item or text on the content item. The object can be identified through machine learning techniques whereby a machine learning system is trained using tagged images of products on the marketplace. An author of the content item can also manually identify objects in the content item, for example the author can provide a keyword or search for the object.

The context of the object can then be analyzed at step 606. The context can include a sentiment towards the object. For example, if an author is posting on social media about how much they detest a certain object, it would be incongruous to provide an opportunity to purchase the object along with the content item. The context can be based on a pose of a person in the content item (e.g., if the person is "showing off" an article of clothing they are wearing), a gesture related to the object (e.g., if the person is giving a thumbs up sign), an expression of a person (e.g., is the person smiling, laughing, or frowning while engaging the object), etc. The context can be based on caption text of the content item such as keywords or hashtags, positive emojii, a description of the object, or a description of a sentiment. For example, the caption 106 in FIG. 1 states that the author "love[s their] new Acme Tennis Racket!" If the caption 106 instead stated that the author thought that the racket was cheap or of poor quality, then the object can be ignored.

In some embodiments, other users as well as the author and viewer of the content item can interact with the content item. It should be understood that "viewer" should not be restricted to visual embodiments. In some embodiments, the users might share the content item, react to the content item such as "liking" the content item, comment on the content item, respond to the content item, etc. These interactions can inform the context of the content item. For example, a negative reaction or comment might indicate that an object depicted in the content item is poorly received or getting negative press. In some embodiments, the content item might be presented in a positive light but critics have responded poorly to the content item. In such cases it can be important to consider both the original sentiment in the content item as well as the response.

In some embodiments, the content item is determined to be a review of the object and the context can include a rating or score that the author gives the object. For example, the author may be providing a review of a movie and the context can include "I give this movie 3 stars out of 5." Certain keywords can be identified for context such as like, love, hate, etc. In some embodiments certain embellishments to text can be considered in the context. For example, if a certain portion is emphasized using underlining, bolding, highlighting, etc. such emphasis can indicate that those portions are important to the context of the content item. Context can also include if a certain portion of text is in all capitals.

At step 608, a system can determine whether an option should be provided to purchase the at least one object. For various reasons disclosed herein, it may be advisable to not provide such an option in certain circumstances. For example, if the content item would be deemed offensive then a viewer would likely associate the offensive content item with the associated option to purchase a marketplace item which could damage the image of the marketplace and/or the marketplace item. Determining whether the option to purchase should be provided with the content item can be determined based on the content item, the context the object, or an associated marketplace item.

In some embodiments, an approbation score can be calculated based on the context of the object. For example, if the context is favorable such as the author applauding the object or featuring the object, then the approbation score can be calculated as a higher value than had the context been critical of the object. In some embodiments, the approbation score can include multiple variables. The approbation score can indicate how "positive" or happy the mood of the content item is (in general or about the object), how much the object is featured in the content item, what percentage of the content item focuses on the object (e.g., amount of a picture and/or text of the content item), an amount of enthusiasm in the content item, etc. For example the approbation score might indicate that the content item has a high number for enthusiasm but a moderate number for praise which might be the case if someone is enthusiastic about the object (e.g., "I love having a tennis racket") but not necessarily praising the object (i.e., the author does not indicate that their specific tennis racket is nice). Certain marketplace items can have minimum approbation scores and can specify a certain level of enthusiasm, praise, specificity, etc. for the marketplace item to be marketed with the content item.

The approbation score can be a Boolean value; that is, it can either indicate that the object is praised by the author or that it is not praised by the author. The approbation score can indicate that the content item is indifferent to the object (i.e., that the object is merely incidental to the content item). In some embodiments, the approbation score can be an indication of how likely a user would engage the object or an option to purchase to the object if presented an option to do so. In some embodiments, a human can provide the approbation scores. A machine learning system can be trained on human-generated approbation scores so that the machine learning system can generates scores independently.

An author might be unusually enthusiastic in their content items. Because their audience likely knows of the author's natural enthusiasm, they may minimize the author's approbation of an object. Similarly, if certain people are always enthusiastic in their content items, their audience may tire of having only options to purchase objects by those authors and not the less enthusiastic ones. Thus, the approbation score can be adjusted to account for an average context for the author. Similarly, approbation scores can adjust to account for an average context for a population that is similar to the author. In some embodiments, a system will only market alongside a limited number of content items for an author; it can then select only the objects that have the highest approbation score. Some objects or items might have general favor or disfavor in a population. For example, a certain product might be popular and positive sentiments are relatively common while another product might be less popular with fewer positive sentiments. The approbation score can be adjusted based on an average approbation score for the object. This can allow relatively basic praise to be highlighted if the object rarely receives praise.

If it is determined that an option should not be provided to purchase the at least one object, then the process can end. Alternatively, a system can analyze another object detected in the content item.

At step 620, a selectable element associated with the marketplace item and the content item can be presented. For example, as shown in FIG. 1, the content item 102 and the marketplace section 128 are jointly presented. A first server can provide the content for the content item 102 while a second server can provide the content for the marketplace section 128. An interface on a client (e.g., a viewer) can render the two elements.

In some embodiments, certain style elements of the application are applied to the marketplace section 128 so that marketplace section 128 has a blended appearance sharing visual elements from the application and the marketplace. This allows a viewer to understand that the marketplace section 128 is integrated within the application. For example, a color, border type, texture, background, or other style from the application can be applied to the selectable element. In some embodiments, the selectable element is placed within the content item and is not a separate element. The selectable element can be a link, a button, an audio clip (e.g., if the content item is an audiobook, the selectable element can be an audio invitation to purchase something mentioned in the book), a 3d object (e.g., in a video game), etc.

In some embodiments, the selectable element is only available after a user has engaged with the content item. For example, the user might interrupt an audiobook to inquire about the object or the user might pause a video. In some embodiments, user engagement includes the user responding to the content item such as might occur in a social media post. For example, a user might "like" a post and then be presented with a selectable element effective to purchase an object featured in the post. Other engagement can include replying or commenting on the content item, playing a video or audio in the content item, engaging with a videogame element, etc. The content item can be hidden until the user engages the object itself, such as clicking a picture.

In some embodiments, executable code from the application (i.e., the application that serves the content item) can indicate a unique identifier that is associated with the content item. A client device can then execute the code and request marketplace section from the marketplace using the unique identifier. In some embodiments, the request includes information from the user profile and the marketplace can only provide the marketplace section if the user profile satisfies requirements for the marketplace item. In some embodiments, the marketplace item is specific to the viewer. For example, a brand and type of shoes can be identified in the content item and then each user can receive a marketplace section with a marketplace item that has their specific shoe size. In other words, a species of marketplace item can be identified and a subspecies specific to the viewer can be presented. In some embodiments, multiple marketplace items (e.g., a blouse and a picture as shown in FIG. 4) can be reviewed and accepted for presentation with the content item. The marketplace can then present whichever marketplace item is most appropriate for the viewer.

A content item can be dynamic (e.g., a video, live stream, audiobook, etc.). Marketplace items can be presented in the marketplace section while the content item is presented. These marketplace items can change. For example, returning to FIG. 4, the blouse, picture, salt grinder, and cola are "on screen" at the present time, but as the camera turns, the cola might leave the frame. When an object leaves the frame, its associated marketplace item can be removed from the marketplace section. For such dynamic content, the marketplace section can be hidden while the content plays but can be available when the content is paused or interrupted. For example, the marketplace section can be hidden and only revealed when it is paused. If a smart assistant is talking and presenting a content item, a user can interrupt the smart assistant and inquire about a product mentioned.

The marketplace section can be overlaid on top of the content item such as in FIG. 3 so that when a user hovers over an object in the content item, the associated marketplace item is shown and a prompt allowing the user to purchase the marketplace item is presented. An indicator can represent that the object is associated with a marketplace item. For example, a bounding box can surround the object, an icon can appear near the object, the object can be highlighted, etc.

The selectable element associated with the marketplace item can be a button to purchase the marketplace item or to learn more about the marketplace item. Selecting can include moving a cursor over the selectable element, clicking the selectable element, speaking a phrase, etc. At step 622, a selection can be received for the selectable element by a viewer. Selection can including moving a cursor onto the selectable element, clicking the selectable element, hovering over the selectable element, speaking words related to the selectable element, or otherwise engaging the selectable element.

The viewer can then be authenticated with the marketplace at step 624. For example, the viewer can input credentials for the marketplace as shown in FIG. 2A. In order to not interrupt the viewer's experience, the authentication can appear to occur within the application for the content item. The marketplace can provide evidence that the viewer is providing their credentials to the marketplace and not some third party (i.e., the application). Evidence can include presenting the viewer's marketplace username to the viewer (e.g., if the viewer has logged in to the marketplace on that device previously). In some embodiments, if a user is not logged in, the authentication can occur on a separate web page or pop-up window for the marketplace. Authenticating the viewer can also ensure that the viewer satisfies restrictions associated with the marketplace item. If the viewer fails to satisfy such restrictions, the process can be terminated and the viewer can be informed that the marketplace item is not available for them.

The viewer can then be enabled to purchase the marketplace item at step 626. For example, the viewer can provide an address and confirm purchase. Step 626 can occur within a window for the application or on a separate window or page. Being within the application can prevent an interruption of the user's experience, but being on a separate page can instill trust and be familiar to the user. In some embodiments, the marketplace item can be flagged for later purchasing. For example, the marketplace item can be placed in a shopping cart for the user whereby the user can later complete the purchase of the marketplace item. In some embodiments, purchasing the item involves a transfer of digital rights to the user. If the marketplace item is a digital item such as a video or song then the video or song could play immediately. This can be useful if a user uploads a clip from a song and posts it on a social media application, other users can then buy rights to the song after listening to the clip. Once a user buys rights to the song, the entirety of the song can be played, instead of or in continuation of the clip. Policies can be enforced to preserve the rights of any copyright holders.

In some embodiments, an application for the content item (e.g., a social media application) and a marketplace for selling marketplace items are third parties to each other meaning access to their respective application server and marketplace server is limited. As such, a server associated with the application can perform certain steps of example method 600 while a server associated with the marketplace can perform other steps of example method 600. For example, a server for the application can provide the content item to a server for the marketplace which can then analyze the content item and provide a selectable element for purchasing a marketplace item associated with an object detected in the content item. In some embodiments, the marketplace provides an API through which the application can communicate with the marketplace and send the content item.

Figure 7:
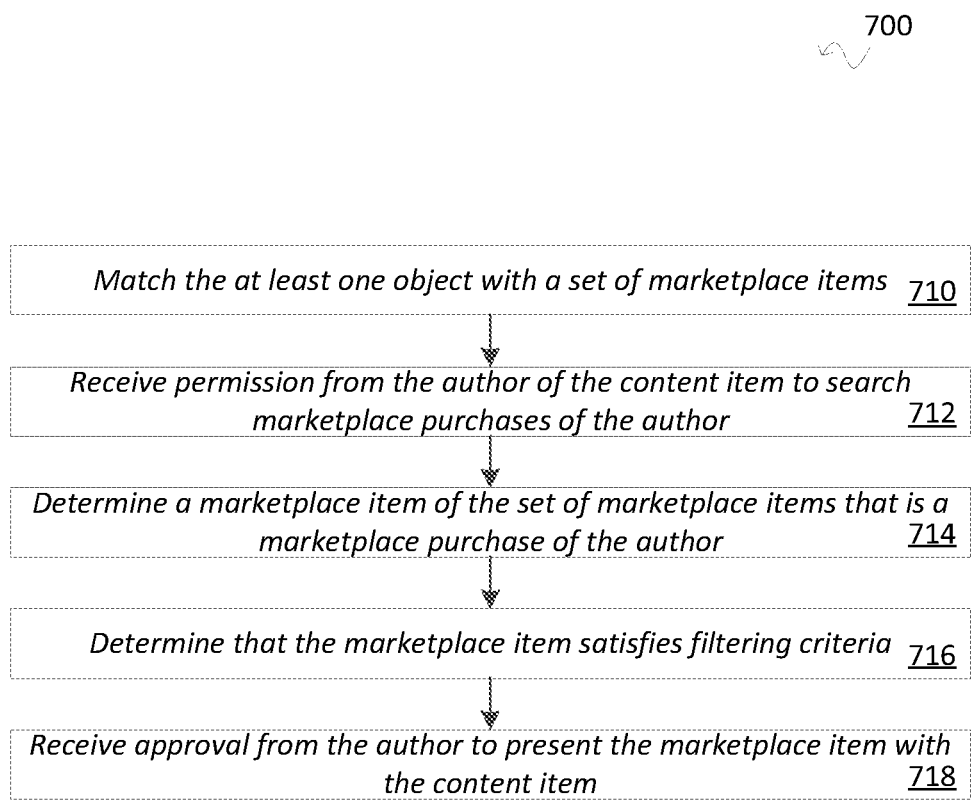
FIG. 7 illustrates an example process for matching a content item with a marketplace item and validating the match in accordance with various embodiments.

FIG. 7 illustrates an example process 700 for analyzing a content item according to various embodiments. Certain portions of example process 700 can be applicable to step 608 of example process 600. In some embodiments, some or all of example process 700 are performed by marketplace server 507. At step 710, at least one object can be matched with a set of marketplace items. For example, if multiple objects are identified in the content item, then multiple marketplace items can be in the set. Additionally, a single object can be matched with multiple marketplace items. For example, if the object is a cell phone, then the cell phone can be matched with marketplace items that are various models of the same brand, various colors of the same model, or various sellers of an identical SKU. The object can be matched with an analogous or comparable marketplace item. For example, if the object is a generic white t-shirt, it can be matched with a premium white t-shirt.

Matching an object with a marketplace item can include determining keywords for the object (e.g., "white," "t-shirt," "soccer ball," "toy," etc.) using object recognition techniques. The keywords can be sourced from the content item using a caption or comments from users. The keywords can also be informed by a profile of the author. This way, if the image recognition software detects "blue jeans" in the content item, other keywords such as "child" sourced from the caption can help prevent men's carpenter jeans from being matched with a child's jeans. Matching can include a serial number detected in the content item.

In some embodiments, after one marketplace item is matched with the object, other related marketplace items can be matched with the object. For example, the system can attempt to match different versions (e.g., colors or model numbers) of the marketplace item with the object. Similarly, a product category or keywords can be derived from the matched content item that can help match other content items. In some embodiments, certain content items go well together and are seen as complementary such as tennis balls and a tennis racket; those complimentary marketplace items can be considered after a first marketplace item is matched.

The author may provide an identifier to a marketplace item, such as a link. Even when the author provides or guides finding a marketplace item, identifying objects in the content item can still be of value. For example, a credit program can give the author credit for referral traffic for a marketplace item and the author can be given greater credit if the author depicts the marketplace item in their content item (e.g., not just linking to buy the item, but showing it in a picture).

In some embodiments, the matching can be done based on a sentiment or approbation score. For example, someone might express confidence towards a wrench or hammer but express satisfaction with a food item. Thus, the sentiment in the content item can be used as a guide to determine what type of marketplace item would be a good match for the detected object.

At step 712, permission can be received from the author of the content item to search marketplace purchases of the author. For example, the author can associate a profile on the marketplace with a profile with an application that presents the content item and, while doing so, grant permission to the marketplace to use past purchase data when selecting a marketplace item. The author can grant permission on a case by case basis so that certain purchases of a sensitive nature will not be marketed alongside the author's content items.

At step 714, a marketplace item of the set of marketplace items can be determined that is a marketplace purchase of the author 714. In some embodiments, step 714 can be performed as part of step 710. That is, with the author's permission, the set of past purchases can be considered or otherwise inform matching objects to content items. In some embodiments, past purchases are first used to match objects and if no matches are found, other marketplace items are analyzed. Past purchases can inform the matching determination, such that a past purchase receives a higher value when matching. In some embodiments, the system will first obtain the set of marketplace purchases and then find likely candidates based on object identification information from the content item. Additionally or alternatively, the system can obtain a set of marketplace items that match the identified object and then see if any were marketplace purchases of the author. In some embodiments, a marketplace item can be determined based on a profile of the author; for example, people with similar characteristics as the author might be more likely to have purchased a certain marketplace item. This can be useful if the marketplace does not have permission to use data of previous marketplace purchases of the author.

In some embodiments, only certain past purchases are considered when analyzing past purchases. For example, with the author's permission, only those past purchases that were recently made (e.g., the past month or year) are considered. In some embodiments, only past purchases where the author (i.e., the purchaser) left a review or rating are considered. If the author has left a negative review or rating of the past purchase, it can be omitted from consideration.

It can then be determined, at step 716, that the marketplace item satisfies filtering criteria. Step 716 can include passing the marketplace item through a product validation engine. The marketplace might have marketplace items of varying quality or public perception. For example, certain marketplace items might have poor reviews and can be excluded from consideration. Other filters include ensuring that a marketplace item has a certain number of reviews, that a seller of the marketplace item has been vetted, that the marketplace item is above a certain price and/or below a certain price, that an associated seller is part of a program to offer marketplace items for purchase with content items, etc. If a product is new, the product validation engine can override a minimum number of reviews or quality of reviews. The validation engine can ensure that the marketplace item has reviews from a class of reviews that are deemed more reliable. The product validation engine can filter out products that are in stock. The product validation engine can boost a score of products that have expedited shipping, and that accept a certain form of payment.

In some embodiments, a manufacturer or a seller of a marketplace item can have restrictions on their marketplace item being marketed next to certain content items or content items by people of a certain age or characteristic. For example, an alcohol company can restrict their products from being advertised alongside posts from underage people. Another restriction can include the portrayal of the marketplace item (i.e., "object") in the content item. For example, a toy gun company might require that their guns cannot be marketed next to content items depicting someone pointing the toy gun at another person. Other restrictions can include that the marketplace item will only be shown to people with certain characteristics (e.g., of a certain age) or during a specific time of day.

In some embodiments, multiple marketplace items are up for consideration at step 716. The product validation engine can then rank the marketplace items based on the above criteria. That is, ranking criteria can include the amount of stock available for the marketplace item, a number of reviews, a review score, a contract with a seller of the marketplace item, shipping availability, seller restrictions, etc. Product validation engine can also intake sales data to determine which marketplace items generate more revenue or have higher conversion rates when placed near relevant content items; rankings can be adjusted accordingly. Marketplace items that are past purchases of the author can be given a higher rank than similar marketplace items that were not past purchases. In some embodiments, a manual review stage can ensure accuracy and compliance with policies.

At some stage in the process, author credibility can be ascertained. For example, certain authors might have little established credibility and thus only a limited selection of marketplace items are available for presenting with their content items or they can be excluded from the program. Author credibility can be determined based on their history with the marketplace (e.g., length of membership and total number or value of purchases) or their history with an application which is used for publishing the content item (e.g., a length of account, a number of publications, a number of credible associates on the application, etc.).

Approval from the author to present the marketplace item with the content item can be received at step 718. In other words, approval can be received to market the marketplace item with the content item as disclosed herein (e.g., at step 620). Because, in some embodiments, the marketplace item is presented with the content item, it can be important to receive approval from the author. If there are multiple marketplace items, they can be ranked as discussed herein and the author can select a preferred marketplace item for presentation next to their content item. In some embodiments, the author approves the marketplace item before publishing the content item. Alternatively or additionally, the author can approve the marketplace item after publishing or while publishing (e.g., for a live stream) the content item. If the author denies approval to present the marketplace item with the content item, other marketplace items can be suggested until a suitable marketplace item is selected.

In some embodiments, a commission can be provided that the author can accept. For example, a percentage of profits of a sale that is made. The author can also be provided with terms and conditions of such an arrangement for approval as well. Different products can have different arrangements and the author can choose the marketplace item that best suits the author.

In some embodiments, the author can decide the type of presentation of the marketplace section. For example, the author can decide that the marketplace section is hidden until a viewer engages the content item or the object. The author can decide whether to show a price of the marketplace item. The author can decide whether to put a disclosure that the author receives a commission on sales of the item; in some embodiments such disclose can be mandatory. The author can decide a certain audience that would see the marketplace section (e.g., non-"friends" of the author, people of a certain age, etc.).

In some embodiments, the author can decide to stylize the content item according to the marketplace item. For example, if the marketplace item is a soccer ball, the content item can be stylized with soccer imagery (e.g., a goal post, grass, a scoreboard). Other integrations are contemplated.

Storage media and other non-transitory computer readable media for containing primary content, supplemental content, or code, or portions of content code, can include any appropriate media known or used in the art, including storage media and communication media, such as, but not limited to, volatile and non-volatile, removable, and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device.

Figure 8:
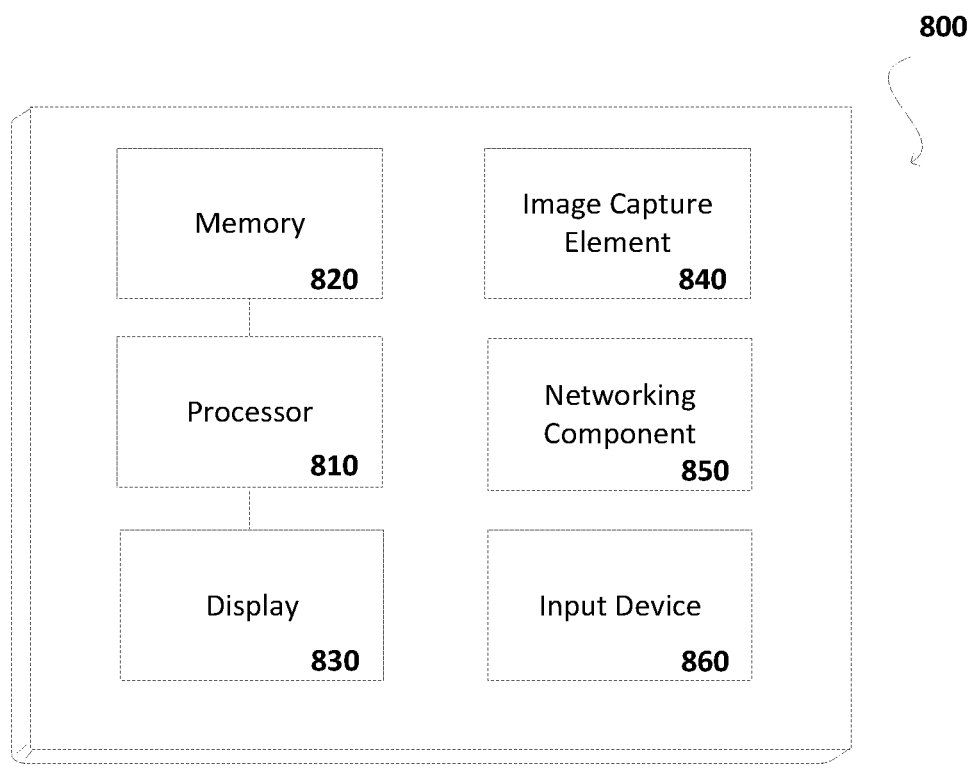
FIG. 8 illustrates components of an example computing device that can be used in accordance with various embodiments.

FIG. 8 illustrates a set of basic components of a device 800 that can be used to implement aspects of the various embodiments. In this example, the device 800 includes at least one processor 810 for executing instructions that can be stored in a memory device or element 820. As would be apparent to one of ordinary skill in the art, the device can include many types of memory 820, data storage, or computer-readable media, such as a first data storage for program instructions for execution by the at least one processor 810, the same or separate storage can be used for images or data, a removable memory 820 can be available for sharing information with other devices, and any number of communication approaches can be available for sharing with other devices. The device typically will include at least one type of display element 830, such as a touch screen, electronic ink (e-ink), organic light emitting diode (OLED), or liquid crystal display (LCD), although devices such as portable media players might convey information via other means, such as through audio speakers.

The device 800 in some embodiments will include at least one video or image capture element 840, such as at least one video or image capture element 840 positioned to determine a relative position of a viewer and at least one video or image capture element 840 operable to image a user, people, or other viewable objects in the vicinity of the device 800. A video or image capture element 840 can include any appropriate technology, such as a charge-coupled device (CCD) video or image capture element 840 having a sufficient resolution, focal range, and viewable area, to capture video or an image when the user is operating the device 800. Methods for capturing images or video using an image capture element with a computing device are well known in the art and will not be discussed herein in detail. It should be understood that video or image capture can be performed using a single image, multiple images, periodic imaging, continuous image capturing, image streaming, etc. The device 800 can include at least one networking component 850 as well, and, as noted, may include one or more components enabling communication across at least one network, such as the internet, a cellular network, an intranet, an extranet, a local area network, Wi-Fi, and the like.

The device 800 can include at least one motion and/or orientation determining element, such as an accelerometer, digital compass, electronic gyroscope, or inertial sensor, which can assist in determining movement or other changes in orientation of the device. The device 800 can include at least one additional input device 860 able to receive conventional input from a user. This conventional input can include, for example, a push button, touch pad, touch screen, wheel, joystick, keyboard, mouse, trackball, keypad, or any other such device or element whereby a user can input a command to the device. These input/output (I/O) devices 860 could even be connected by a wireless infrared, Bluetooth, or other link as well in some embodiments. In some embodiments, however, such a device 800 might not include any buttons at all and might be controlled only through a combination of visual and audio commands such that a user can control the device without having to be in contact with the device.

The various embodiments can be implemented in a wide variety of programming languages and operating environments, which in some cases can include one or more user computers, computing devices, or processing devices which can be used to operate any of a number of applications. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in the accompanying figures. Further, one programming language may be utilized for the training phase, while another language may be used to develop the production system. Thus, the depiction of the systems and environments in the figures, as well as this written description, should be taken as being illustrative in nature and not limiting to the scope of the disclosure.

User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network 504 that would be familiar to those skilled in the art for supporting communications using any of a variety of commercially-available protocols, such as Transmission Control Protocol/Internet Protocol (TCP/IP), Open System Interconnection (OSI), File Transfer Protocol (FTP), Universal Plug and Play (UpnP), Network File System (NFS), Common Internet File System (CIFS), and AppleTalk. The network 504 can be, for example, a local area network, a wide-area network, a virtual private network, the Internet, an intranet, an extranet, a public switched telephone network, an infrared network, a wireless network, and any combination thereof In embodiments utilizing a Web server, the Web server can run any of a variety of server or mid-tier applications, including Hypertext Transfer Protocol (HTTP) servers, File Transfer Protocol (FTP) servers, Common Gateway Interface (CGI) servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

Based on the disclosure and teachings provided herein, a person of ordinary skill in the art will appreciate other ways and/or methods to implement the various embodiments. The specification and drawings are, accordingly, to be regarded in an illustrative, rather than a restrictive, sense. It will be evident that various modifications and changes may be made thereunto without departing from the broader spirit and scope of the invention as set forth in the claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

What is claimed is:

1. A computer-implemented method for presenting a content item with an associated marketplace item, comprising:
   receiving a social media post, the post including a first image and having an author, the first image being compressed to a first file size;
   detecting at least one object represented in the first image;
   in response to detecting the at least one object, receiving a second image, the second image including a representation of the at least one object and being a second file size larger than the first file size;
   determining one or more features of the at least one object in the second image;
   determining an approbation score of the object in the social media post;
   determining that the approbation score is above a certain amount;
   identifying a marketplace item corresponding to the object, based at least in part on the one or more features, and available for consumption; and
   providing for display with a social media post, using a server associated with a marketplace provider and based at least in part on the approbation score, a selectable element representing the marketplace item and an option to purchase the marketplace item, the selectable element being presentable within a region at least partially overlapping the social media post and including a third image of the item, different from the first image, corresponding to a representation of the marketplace item.

2. The computer-implemented method of claim 1, wherein the post is presented in a social media application for a first server and the selectable element is inserted into the social media application, the method further comprising:
   receiving a selection of the selectable element; and
   overlaying an interactive purchasing window on the social media application, the interactive purchasing element being served by the second server.

3. The computer-implemented method of claim 2 wherein the selection of the selectable element is associated with a user of the social media application, further comprising:
   authenticating the user with the server associated with the marketplace provider using the interactive purchasing element.

4. A computer-implemented method for presenting a content item with an associated marketplace item, comprising:
   obtaining a user-provided content item, the content item including at least a first image being compressed to a first file size;
   detecting at least one object represented in the content item;
   receiving a second image, the second image being a second file size larger than the first file size;
   determining one or more features of the at least one object in the second image;
   determining an approbation score of the at least one object in the content item;
   determining that the approbation score satisfies a predetermined criteria;
   match the at least one object with a marketplace item, based at least in part on the one or more features; and
   present a selectable element associated with the marketplace item and the content item, the selectable element being presentable within a region at least partially overlapping the content item and including a third image of the item, different from the first image, corresponding to a representation of the marketplace item.

5. The computer-implemented method of claim 4, further comprising:
   determining a context of the object in the content item; and
   determining that the context is positive.

6. The computer-implemented method of claim 5, wherein determining a context of the object is based on a caption in the content item.

7. The computer-implemented method of claim 5, wherein determining a context of the object is based on a reaction to the content item published with the content item, the reaction being by a user that is not an author of the content item.

8. The computer-implemented method of claim 4, wherein the content item has an author, wherein matching the at least one object with the marketplace item includes:
   receiving permission from the author to search marketplace purchases of the author;
   determining a set of marketplace items that match the object, the set of marketplace items including the marketplace item; and
   determining that the marketplace item is a marketplace purchase of the author.

9. The computer-implemented method of claim 4, wherein the content item has an author, the method further comprising receiving approval from the author to present the object with the post.

10. The computer-implemented method of claim 4, wherein the content item has an author, the method further comprising:
    determining a credibility metric of the author; and
    determining that the credibility metric is above a predetermined amount.

11. The computer-implemented method of claim 4, wherein the content item has an author, the method further comprising:
    matching the object with a plurality of marketplace items; and
    receiving a selection from the author of the marketplace item from the plurality of marketplace items.

12. The computer-implemented method of claim 4, wherein the content item is provided by a first service, the selectable element is provided by a second service, and the first service and the second service are third parties to each other.

13. The computer-implemented method of claim 4, further comprising:
    determining a context of the content item;
    obtaining a context filter from a seller of the marketplace item; and
    determining that the context satisfies the context filter.

14. A system, comprising:
    at least one processor; and
    memory including instructions that, when executed by the at least one processor, cause the system to:
        obtain a social media post, the content item including at least a first image being compressed to a first file size;
        detect at least one object represented in the social media post;

receive a second image, the second image being a second file size larger than the first file size;

determine one or more features of the at least one object in the second image;

determine an approbation score of the object in the social media post;

determine that the approbation score is above a threshold amount;

match the at least one object represented in the social media post with a marketplace item, based at least in part on the one or more features; and display the social media post and a selectable element for purchasing the marketplace item, the selectable element being presentable within a region at least partially overlapping the social media post and including a third image of the item, different from the first image, corresponding to a representation of the marketplace item.

15. The system of claim 14, wherein the instructions when executed further cause the system to:

determine a sentiment of the social media post; and
determine that the sentiment is positive.

16. The system of claim 14, wherein the social media post has an author and the instructions when executed further cause the system to:

receive permission from the author to search marketplace purchases of the author;

determine a set of marketplace items that match the object, the set of marketplace items including the marketplace item; and determine that the marketplace item is a marketplace purchase of the author.

17. The system of claim 14, wherein the social media post has an author and the instructions when executed further cause the system to receive approval from the author to display the selectable element for purchasing the marketplace item with the social media post.

18. The system of claim 14, wherein the social media post has an author and the instructions when executed further cause the system to:

determine a credibility metric of the author; and
determine that the credibility metric is above a predetermined amount.

19. The system of claim 14, wherein the social media post has an author and the instructions when executed further cause the system to:

match the object with a plurality of marketplace items; and receive a selection from the author of the marketplace item from the plurality of marketplace items.

20. The system of claim 14, wherein the social media post is provided by a first service and the selectable element is provided by a second service, the first service and the second service being third parties to each other.

* * * * *